(12) United States Patent
Rousseau

(10) Patent No.: US 8,530,604 B2
(45) Date of Patent: *Sep. 10, 2013

(54) DEFORMABLE SHAPE-MEMORY POLYMER

(75) Inventor: Ingrid A. Rousseau, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/956,513

(22) Filed: Nov. 30, 2010

(65) Prior Publication Data

US 2012/0136126 A1   May 31, 2012

(51) Int. Cl.
| | |
|---|---|
| C08G 59/06 | (2006.01) |
| C08G 59/42 | (2006.01) |
| C08G 59/50 | (2006.01) |
| C08G 59/56 | (2006.01) |
| C08G 59/58 | (2006.01) |
| C08L 63/00 | (2006.01) |
| C08L 63/02 | (2006.01) |

(52) U.S. Cl.
USPC ........... 528/121; 525/481; 525/523; 525/533; 528/123

(58) Field of Classification Search
None
See application file for complete search history.

(56) References Cited

U.S. PATENT DOCUMENTS 6,248,204 B1 * 6/2001 Schuft ........................ 156/305
6,849,195 B2 * 2/2005 Basheer et al. ............ 252/62.54
2005/0113553 A1 * 5/2005 Birnbrich et al. ............. 528/103
2008/0292848 A1 * 11/2008 Xie et al. ...................... 428/174
2009/0235754 A1 * 9/2009 Tseng et al. .................... 73/754
2011/0278052 A1 * 11/2011 Hsu .............................. 174/258

OTHER PUBLICATIONS

HCAPLUS accession No. 2008:17249 and Derwent accession No. 2008-M02980 for Chinese Patent No. 10109644 A, Liu et al., Jan. 2, 2008, two pages each.*
HCAPLUS accession No. 2008:52917 and Derwent accession No. 2008-M13248 for Chinese Patent No. 101100545 A, Du et al., Jan. 9, 2008, one and two pages, respectively.*
HCAPLUS accession No. 2010:923825 and Derwent accession No. 2010-K70532 for Chinese Patent No. 101781427 A, Leng et al., Jul. 21, 2010, two pages each.*
Sartomer product bulletin for SMA EF-40 Flake, Mar. 2002, p. 2965.*
D.M. Feldkamp, I.A. Rousseau, "Effect of the Deformation Temperature on the Shape-Memory Behavior of Epoxy Networks", Macromolecular Materials and Engineering, 2010, pp. 726-734, vol. 295.

* cited by examiner

Primary Examiner — Robert Sellers
(74) Attorney, Agent, or Firm — Quinn Law Group, PLLC

(57) ABSTRACT

A polymer includes a reaction product of an epoxy resin, a first crosslinking agent, and a second crosslinking agent. The first crosslinking agent is reactive with the epoxy resin and has a first molecular weight. The second crosslinking agent is reactive with the epoxy resin and has a second molecular weight of at least ten times greater than the first molecular weight. The polymer has a first phase having a first glass transition temperature and a second phase having a second glass transition temperature that is lower than the first glass transition temperature. The polymer is transformable between a first shape and a second shape at the first glass transition temperature.

14 Claims, 5 Drawing Sheets

DEFORMABLE SHAPE-MEMORY POLYMER

TECHNICAL FIELD

The present disclosure generally relates to a polymer.

BACKGROUND

Polymers are often useful for applications requiring excellent strength, durability, temperature stability, and chemical stability. In particular, shape-memory polymers may be useful for applications also requiring temperature-dependent, i.e., thermally-activated, transitions between a first, permanent shape and a second, temporary shape. The temperature-dependent transitions generally occur at a specific transformation temperature based on a composition of the shape-memory polymer. Such applications often require a polymer having a combination of high tensile strength, high deformability, and high transformation temperature.

SUMMARY

A polymer includes a reaction product of an epoxy resin, a first crosslinking agent, and a second crosslinking agent. The first crosslinking agent is reactive with the epoxy resin and has a first molecular weight. The second crosslinking agent is reactive with the epoxy resin and has a second molecular weight of at least ten times greater than the first molecular weight. The polymer has a first phase having a first glass transition temperature, and a second phase having a second glass transition temperature that is lower than the first glass transition temperature. The polymer is transformable between a first shape and a second shape at the first glass transition temperature.

In one variation, the polymer includes a reaction product of the epoxy resin, a first amine reactive with the epoxy resin and having the first molecular weight that is less than approximately 500 g/mol, and a second amine reactive with the epoxy resin and having the second molecular weight of greater than approximately 2,000 g/mol. Further, the second amine has the polyether backbone including ethylene oxide and propylene oxide in a ratio of ethylene oxide to propylene oxide of from about 0.1:1 to about 0.5:1. In addition, the epoxy resin is present in the first phase in an amount of greater than 50 parts by weight based on 100 parts by weight of the first phase.

In another variation, the polymer includes a reaction product of a diglycidyl ether of bisphenol-A-based epoxy resin, a first etheramine reactive with the diglycidyl ether of bisphenol-A-based epoxy resin and having a first molecular weight of less than approximately 500 g/mol, and a second oligomeric etheramine reactive with the diglycidyl ether of bisphenol-A-based epoxy resin and having a second molecular weight of greater than approximately 2,000 g/mol. The second oligomeric etheramine has the polyether backbone including ethylene oxide and propylene oxide in a ratio of ethylene oxide to propylene oxide of from about 0.1:1 to about 0.5:1. Further, the diglycidyl ether of bisphenol-A-based epoxy resin is present in the first phase in an amount of greater than 50 parts by weight based on 100 parts by weight of the first phase.

The polymer exhibits excellent deformability and elongation at break at elevated first glass transition temperatures. Further, the polymer has excellent strength, thermal and chemical stability, and shape-memory properties.

The above features and advantages and other features and advantages of the present disclosure are readily apparent from the following detailed description of the best modes for carrying out the disclosure when taken in connection with the accompanying drawings.

DETAILED DESCRIPTION

Figure 1:
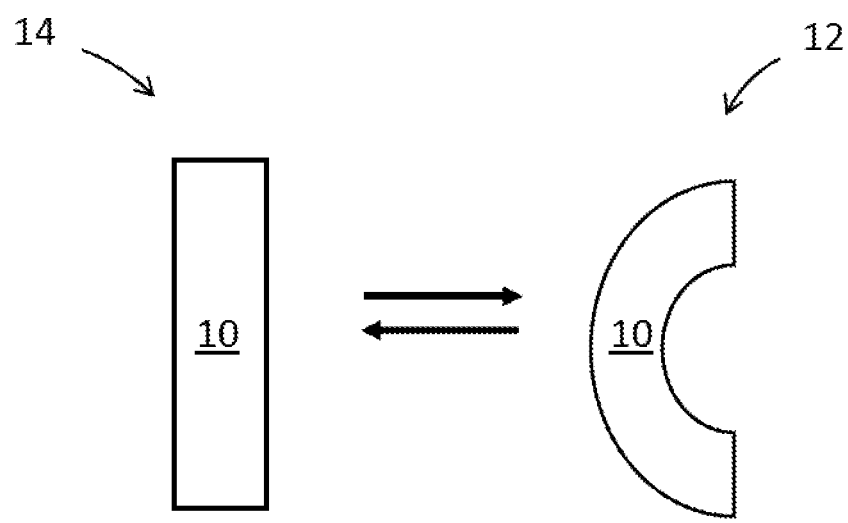
FIG. 1 is a schematic illustration of a polymer, wherein the polymer is transformable between a first shape and a second shape.

Referring to the Figures, wherein like reference numerals refer to like elements, a polymer is shown generally at 10 in FIG. 1. The polymer 10 may be useful for applications, such as structural applications, requiring materials having shape-memory properties and excellent tensile strength and deformability at elevated temperatures, as set forth in more detail below. For example, the polymer 10 may be useful for automotive, aerospace, robotic, construction, and other transportation and industrial applications requiring excellent strength, durability, and deformability at elevated transformation temperatures.

With continued reference to FIG. 1, the polymer 10 may be characterized as a shape-memory polymer. As used herein, the terminology "shape-memory" refers to a material capable of memorizing a second shape (denoted at 12 in FIG. 1), i.e., a temporary shape, and recovering a first shape (denoted at 14 in FIG. 1), i.e., an original or permanent shape, by thermal-, light-, or electro-activation. That is, the shape-memory polymer may be capable of transitioning between one or more different shapes 12, 14, forms, or configurations.

Shape-memory polymers, which may also be referred to as "smart polymers", are polymers or compositions that have an ability to "remember" the first shape 14, i.e., the original, permanent shape that is formed by a curing reaction of the polymer 10 including covalent crosslinking between individual polymer chains. The polymer 10 may be deformed to the second shape 12, i.e., the temporary shape, by simultaneously applying a desired deformation and a change in temperature. The first shape 14 may be subsequently "recovered" by applying an external stimulus, e.g., an activation signal such as a change in temperature, to the polymer 10. That is, the polymer 10 may have a specific transformation temperature, $T_{trans}$, at which the polymer 10 transitions between the first shape 14 and the second shape 12. As the ambient temperature is increased to above the transformation temperature, $T_{trans}$, of the polymer 10, the first shape 14 of the polymer 10 may be spontaneously recovered provided that there are no external space constraints preventing the shape recovery.

Deformation of the polymer 10 from the first shape 14 to the second shape 12 may be a temporary condition. Therefore, shape-memory polymers may be thermally-activated smart materials and may transition between shapes 12, 14 or configurations via heating and cooling according to a glass transition or melting temperature of the shape-memory polymer, as set forth in more detail below.

Further, although shown as a bar or strip in FIG. 1, the polymer 10 may have any suitable form, configuration, or shape. For example, the polymer 10 may have a form of a shape-changing element. That is, the polymer 10 may have a form selected from the group of springs, tapes, wires, bands, continuous loops, and combinations thereof. Alternatively, the polymer 10 may have a form of a structural element, such as, but not limited to, a panel, beam, strut, support, truss, and combinations thereof. In one non-limiting variation, the polymer 10 may be formed as a body component of a vehicle (not shown). For example, the polymer 10 may be formed as a body panel, roof panel, hood, trunk lid, bumper, fascia, or wheel well.

The polymer 10 includes a reaction product of an epoxy resin, a first crosslinking agent, and a second crosslinking agent as follows.

The epoxy resin may include monomers or short-chain polymers attached to at least one epoxide group, i.e., a cyclic ether having three ring atoms. Suitable epoxy resins include derivatives of bisphenol-A. For example, the epoxy resin may be a diglycidyl ether of bisphenol-A-based epoxy resin. More specifically, the epoxy resin may be represented by the general structure:

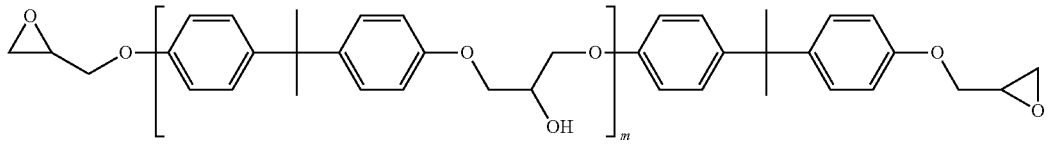

wherein m is from about 0.05 to about 0.2. Further, the epoxy resin may have a molecular weight of from approximately 350 g/mol to approximately 400 g/mol, e.g., from approximately 360 g/mol to approximately 385 g/mol. As used herein, the terminology "molecular weight" refers to a method of characterizing a polymer according to the ordinary arithmetic mean or average of the molecular weights of individual macromolecules of the polymer 10. That is, the molecular weight referenced herein is a number average molecular weight. The number average molecular weight may be determined by measuring the molecular weight of n polymer molecules, summing the individual molecular weights, and dividing by n. As such, the molecular weight is generally an approximate value. Specific examples of suitable epoxy resins include EPON™ Resin 826, commercially available from Hexion Specialty Chemicals, Inc. of Columbus, Ohio, and D.E.R. 383, commercially available from The Dow Chemical Company of Midland, Mich.

The first crosslinking agent is reactive with the epoxy resin and has a first molecular weight. The first crosslinking agent may be selected according to functional group reactivity with the epoxy resin. For example, the first crosslinking agent may be selected from the group of phenolics, amines, anhydrides, carboxylic acids, aldehydes, and combinations thereof. In one non-limiting example, the first crosslinking agent may be an amine, such as, but not limited to, an etheramine. As used herein, the terminology "etheramine" refers to a material having a polyether backbone and at least one amino group attached to the polyether backbone. The polyether backbone may be propylene oxide-based, ethylene oxide-based, polyethylene glycol-based, polypropylene glycol-based, polytetramethylene glycol-based, and combinations thereof. In one non-limiting variation, the polyether backbone may be both ethylene oxide- and propylene oxide-based. The first crosslinking agent may be, for example, a monoamine, a diamine, or a triamine. Specific examples of suitable first crosslinking agents are commercially available from Huntsman International LLC of The Woodlands, Tex., under the trade name JEFFAMINE®.

More specifically, the first molecular weight may be less than or equal to approximately 500 g/mol. For example, the first crosslinking agent may be an etherdiamine having a first molecular weight of less than or equal to approximately 250 g/mol. In one variation, the etherdiamine may have a first molecular weight of less than or equal to approximately 150 g/mol. The etherdiamine may be represented by the general structure:

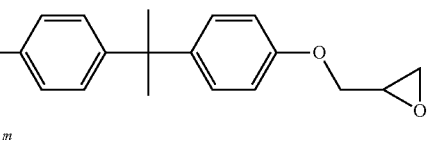

wherein x=2. In another non-limiting variation, the first crosslinking agent may be an ethertriamine having a first molecular weight of less than or equal to approximately 450 g/mol. The ethertriamine may be represented by the general structure:

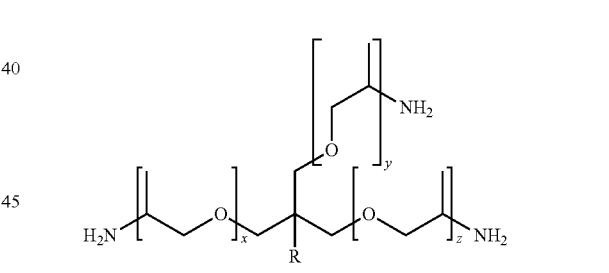

wherein (x+y+z) is from about 5 to about 6 and wherein R is selected from the group of hydrogen and $C_2H_5$. As such, the first crosslinking agent may include branching and may have a branched polyether backbone. Specific suitable examples of the first crosslinking agent are commercially available from Huntsman International LLC of The Woodlands, Tex., under the trade names JEFFAMINE® EDR-148 and JEFFAMINE® T-403.

The second crosslinking agent is reactive with the epoxy resin and has a second molecular weight of at least ten times greater than the first molecular weight. More specifically, the second molecular weight may be from approximately 2,000 g/mol to approximately 5,000 g/mol. Without intending to be limited by theory, the second molecular weight that is at least ten times the first molecular weight may provide the polymer 10 with excellent deformability and elongation at break, as set forth in more detail below.

The second crosslinking agent may also be selected according to functional group reactivity with the epoxy resin.

For example, the second crosslinking agent may be selected from the group of phenolics, amines, anhydrides, carboxylic acids, aldehydes, and combinations thereof. In one non-limiting example, the second crosslinking agent may be an amine, such as, but not limited to, an oligomeric amine. As used herein, the terminology "oligomeric" refers a material having a few monomer units, e.g., a dimer, trimer, or tetramer. For example, the second crosslinking agent may be an oligomeric etheramine.

The second crosslinking agent may be an amine having a polyether backbone and at least one amino group attached to the polyether backbone. The polyether backbone of the second crosslinking agent may include propylene oxide. In another variation, the polyether backbone may further include ethylene oxide. That is, the second crosslinking agent may include a mixture of propylene oxide and ethylene oxide and, as such, may be propylene oxide- and ethylene oxide-based. A ratio of ethylene oxide to propylene oxide in the second crosslinking agent may be less than about 1:1. For example, the ratio may be from about 0.1:1 to about 0.5:1. Without intending to be limited by theory, the aforementioned ratio may contribute to both the excellent deformability of the polymer 10 and the elevated transformation temperatures, $T_{trans}$, as set forth in more detail below. That is, as the amount of ethylene oxide in the second crosslinking agent increases, an elongation at break, $\epsilon_b$, of the polymer 10 may also increase. In addition, the ratio of ethylene oxide to propylene oxide of the second crosslinking agent of less than or equal to about 1:1 may contribute to phase separation within the polymer 10 and thereby contribute to the elevated transformation temperatures, $T_{trans}$, and elongation at break, $\epsilon_b$, of the polymer 10, as also set forth in more detail below.

In a non-limiting example, the second crosslinking agent may be an etherdiamine having a second molecular weight of approximately 2,000 g/mol. In this example, the etherdiamine may be propylene oxide-based and may be represented by the general structure:

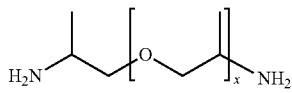

wherein x is about 33. In another non-limiting variation, the second crosslinking agent may be an ethermonoamine having a second molecular weight of approximately 2,000 g/mol. For this variation, the ethermonoamine may be propylene oxide- and ethylene oxide-based and may be represented by the general structure:

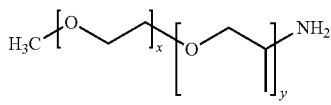

wherein x is about 6 and y is about 29. In yet another non-limiting variation, the second crosslinking agent may be an ethertriamine having a second molecular weight of approximately 5,000 g/mol. The ethertriamine may be represented by the general structure:

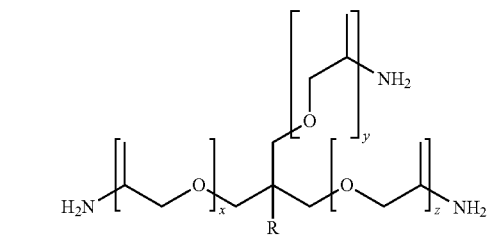

wherein (x+y+z) is about 85 and wherein R is selected from the group of hydrogen and $C_2H_5$. As such, the second crosslinking agent may include branching and may have a branched polyether backbone. Specific suitable examples of the second crosslinking agent are commercially available from Huntsman International LLC of The Woodlands, Tex., under the trade names JEFFAMINE® D-2000, JEFFAMINE® M-2005, and JEFFAMINE® T-5000.

The polymer 10 has a first phase having a first glass transition temperature, $T_{g1}$. That is, the first glass transition temperature, $T_{g1}$, is associated with the first phase. As used herein, the terminology "glass transition temperature" refers to a temperature at which the polymer 10 or a constituent of the polymer 10 transforms from a harder, glass-like state to a softer, rubbery state. Glass transition temperature defines the aforementioned transformation as a change in mechanical properties of the polymer 10. Although set forth in more detail below, glass transition temperatures may be measured by dynamic mechanical analysis at an apex of a tan δ curve of the polymer 10, wherein δ is the loss angle of the polymer 10. Glass transition temperatures may also be measured by differential scanning calorimetry. In this case, glass transition temperatures are determined at a step in heat flow signal.

The first phase of the polymer 10 may be characterized as epoxy-rich and continuous. That is, the epoxy resin may be present in the first phase in an amount of greater than 50 parts by weight based on 100 parts by weight of the first phase. Stated differently, the first phase may include more of the epoxy resin than any other component of the first phase. The first glass transition temperature, $T_{g1}$, may be greater than or equal to about 70° C. For example, the first glass transition temperature, $T_{g1}$, may be greater than or equal to about 95° C. Although set forth in more detail below, the polymer 10 may transform from the permanent first shape 12 to the temporary second shape 14 at the first glass transition temperature, $T_{g1}$, when an external force is applied to the polymer 10 to thereby assist the shape change. That is, the first glass transition temperature, $T_{g1}$, may correspond to the transformation temperature, $T_{trans}$, of the polymer 10. Thereafter, in contrast, only thermal activation may trigger the polymer 10 to transform from the temporary second shape 14 to the permanent first shape 12

The polymer 10 also has a second phase having a second glass transition temperature, $T_{g2}$, that is lower than the first glass transition temperature, $T_{g1}$. That is, the polymer 10 may be characterized as biphasic. In contrast to the first phase, the second phase may be characterized as polyether-rich, e.g., ethylene oxide- and/or propylene oxide-rich. Therefore, the second glass transition temperature, $T_{g2}$, may be sub-zero and correspond to the glass transition of a polyether constituent of the polymer 10. Therefore, the second glass transition temperature, $T_{g2}$, is associated with the second phase and may be different from the first glass transition temperature, $T_{g1}$, of the first phase.

Decreasing the ratio of ethylene oxide to propylene oxide of the second crosslinking agent as set forth above may promote formation of the first, epoxy-rich phase and the second, polyether-rich phase, wherein the first phase is immiscible within the second phase. These results may be attributable to a comparatively lower compatibility between ethylene oxide segments and the epoxy resin of the polymer 10 as compared to the compatibility of propylene oxide segments and the epoxy resin.

Referring again to FIG. 1, the polymer 10 is transformable between the first shape 14 and the second shape 12 at the first glass transition temperature, $T_{g1}$. That is, the polymer 10 may exhibit shape-memory properties and transition between the first shape 14 and the second shape 12. Moreover, the polymer 10 may have an elongation at break of greater than about 11% at a temperature, e.g., a temperature of the polymer 10 during deformation, greater than the first glass transition temperature, $T_{g1}$. The polymer 10 may exhibit the aforementioned elongation at break at a temperature greater than the first glass transition temperature, $T_{g1}$, and less than a degradation temperature of the polymer 10. As used herein, the terminology "degradation temperature" refers to a temperature at which the polymer 10 degrades under the influence of heat, e.g., by the scission of polymer chain bonds. Therefore, the polymer 10 exhibits excellent deformability and elongation at break at elevated first glass transition temperatures, $T_{g1}$, below the degradation temperature of the polymer 10. That is, the polymer 10 may not fail under a tensile strain of less than about 10% at elevated first glass transition temperatures, $T_{g1}$, of greater than about 70° C.

Further, the polymer 10 may be a thermoset polymer. As used herein, the terminology "thermoset" refers to a polymer 10 that is set by heating the polymer 10 to a curing temperature at which the polymer 10 melts and flows, then covalently crosslinks to set the polymer 10 into the first shape 14. That is, the thermoset polymer 10 irreversibly cures through crosslinking during the curing reaction of the polymer 10.

In contrast, a thermoplastic polymer includes polymer chains that are not covalently crosslinked, but rather are physically crosslinked, so that the polymer may be repeatedly melted and molded. Generally, no chemical change occurs in a thermoplastic polymer as the polymer is set in shape. Further, thermoplastic polymers generally have relatively higher ultimate strains, and therefore higher deformation strains because of greater potential for molecular motion, as compared to the thermoset polymer 10. Thermoplastic polymers also generally have a low glass transition temperature as compared to the thermoset polymer 10. Examples of thermoplastic polymers include, but are not limited to, polyamide, polybutyl terephthalate, polyethylene terephthalate, polycarbonate, polyethylene, polypropylene, and polyvinyl chloride.

In one variation, the polymer 10 includes a reaction product of the epoxy resin, a first amine reactive with the epoxy resin and having the first molecular weight of less than approximately 500 g/mol, and a second amine reactive with the epoxy resin and having the second molecular weight of greater than approximately 2,000 g/mol. The second amine has the polyether backbone including ethylene oxide and propylene oxide in a ratio of ethylene oxide to propylene oxide of from about 0.1:1 to about 0.5:1. For example, the ratio of ethylene oxide to propylene oxide may be from about 0.2:1 to about 0.4:1.

Further, the polymer 10 has the first phase having the first glass transition temperature, $T_{g1}$, and the second phase having the second glass transition temperature, $T_{g2}$, that is lower than the first glass transition temperature, $T_{g1}$. Epoxy resin is present in the first phase in an amount of greater than 50 parts by weight based on 100 parts by weight of the first phase, and the polymer 10 is transformable between the first shape 14 and the second shape 12 at the first glass transition temperature, $T_{g1}$.

In another variation, the polymer 10 includes a reaction product of a diglycidyl ether of bisphenol-A-based epoxy resin, a first etheramine reactive with the diglycidyl ether of bisphenol-A-based epoxy resin and having a first molecular weight of less than approximately 500 g/mol, and a second oligomeric etheramine reactive with the diglycidyl ether of bisphenol-A-based epoxy resin and having a second molecular weight of greater than approximately 2,000 g/mol. The second oligomeric etheramine has the polyether backbone including ethylene oxide and propylene oxide in a ratio of ethylene oxide to propylene oxide of from about 0.1:1 to about 0.5:1. For example, the ratio of ethylene oxide to propylene oxide may be from about 0.2:1 to about 0.4:1.

Further, the polymer 10 has the first phase having a first glass transition temperature, $T_{g1}$, and the second phase having the second glass transition temperature, $T_{g2}$, that is lower than the first glass transition temperature, $T_{g1}$. The diglycidyl ether of bisphenol-A-based epoxy resin is present in the first phase in an amount of greater than 50 parts by weight based on 100 parts by weight of the first phase, and the polymer 10 is transformable between the first shape 14 and the second shape 12 at the first glass transition temperature, $T_{g1}$.

The polymer 10 exhibits excellent deformability and elongation at break, $\epsilon_b$, at an elevated first glass transition temperature, $T_{g1}$. Further, the polymer 10 has excellent strength, e.g., a modulus of from about 1.2 GPa to about 2.6 GPa, thermal stability, e.g., stability up to about 250° C., chemical stability, and excellent shape-memory properties, e.g., shape fixing and shape recovery of greater than about 95%.

The following examples are meant to illustrate the disclosure and are not to be viewed in any way as limiting to the scope of the disclosure.

EXAMPLES

To prepare the polymers of Examples 10-61, components ER, D1-D4, M1, M2, and T1-T3 are combined in the amounts listed in Table 1. Specifically, the components listed in Table 1 are added and mixed manually prior to degassing at about room temperature to form a mixture for each of Examples 10-61. Each mixture is poured into a glass mold coated with Chemlease® 5037 mold release agent, commercially available from Chem Trend of Howell, Mich. Each mold is sealed, and each mixture is cured for 2 hours at 80° C. and 2 hours at 125° C. to form the respective polymers of Examples 10-61. Each polymer is formed as a plaque having a thickness of about 3.0 mm. The nomenclature CA1 in Table 1 refers to a first crosslinking agent and the nomenclature CA2 refers to a second crosslinking agent.

TABLE 1

| | Polymer Compositions | | | | |
| --- | --- | --- | --- | --- | --- |
| Sample | Epoxy Resin | CA 1 | CA 2 | Epoxy:(CA1 + CA2) (mol:mol) | CA2:CA1 (mol:mol) |
| Ex. 10 | ER | D1 | D2 | 1.90 | 10.03 |
| Ex. 11 | ER | D1 | D3 | 1.90 | 1.20 |
| Ex. 12 | ER | D1 | D4 | 1.90 | 0.12 |
| Ex. 20 | ER | D1 | D2 | 1.90 | 0.02 |
| Ex. 21 | ER | D1 | D3 | 1.90 | 0.02 |
| Ex. 22 | ER | D1 | D4 | 1.90 | 0.02 |
| Ex. 30 | ER | T1 | T1 | 2.85 | 0.95 |

TABLE 1-continued

Polymer Compositions

| Sample | Epoxy Resin | CA 1 | CA 2 | Epoxy:(CA1 + CA2) (mol:mol) | CA2:CA1 (mol:mol) |
|---|---|---|---|---|---|
| Ex. 31 | ER | T1 | T2 | 2.85 | 0.08 |
| Ex. 32 | ER | T1 | T3 | 2.85 | 0.03 |
| Ex. 40 | ER | T1 | T1 | 2.85 | 0.09 |
| Ex. 41 | ER | T1 | T2 | 2.85 | 0.09 |
| Ex. 42 | ER | T1 | T3 | 2.85 | 0.09 |
| Ex. 50 | ER | D1 | M1 | 1.81 | 0.12 |
| Ex. 51 | ER | D1 | M2 | 1.81 | 0.12 |
| Ex. 60 | ER | D1 | M1 | 1.90 | 0.02 |
| Ex. 61 | ER | D1 | M2 | 1.90 | 0.02 |

Component ER is a diglycidyl ether of bisphenol-A epoxy resin having a molecular weight of approximately 383 g/mol. Component ER is commercially available under the trade name D.E.R. 383 from The Dow Chemical Company of Midland, Mich.

Component D1 is an ethylene oxide-based etherdiamine having a first molecular weight of approximately 148 g/mol. Component D1 is commercially available under the trade name JEFFAMINE® EDR-148 from Huntsman International LLC of The Woodlands, Tex.

Component D2 is a propylene oxide-based etherdiamine having a second molecular weight of approximately 230 g/mol. Component D2 is commercially available under the trade name JEFFAMINE® D-230 from Huntsman International LLC of The Woodlands, Tex.

Component D3 is a propylene oxide-based etherdiamine having a second molecular weight of approximately 400 g/mol. Component D3 is commercially available under the trade name JEFFAMINE® D-400 from Huntsman International LLC of The Woodlands, Tex.

Component D4 is a propylene oxide-based etherdiamine having a second molecular weight of approximately 2,000 g/mol. Component D4 is commercially available under the trade name JEFFAMINE® D-2000 from Huntsman International LLC of The Woodlands, Tex.

Component M1 is a propylene oxide- and ethylene oxide-based ethermonoamine having a second molecular weight of approximately 2,000 g/mol and a ratio of propylene oxide to ethylene oxide of 4.83:1. Component M1 is commercially available under the trade name JEFFAMINE® M-2005 from Huntsman International LLC of The Woodlands, Tex.

Component M2 is a propylene oxide- and ethylene oxide-based ethermonoamine having a second molecular weight of approximately 2,000 g/mol and a ratio of propylene oxide to ethylene oxide of 0.32:1. Component M2 is commercially available under the trade name JEFFAMINE® M-2070 from Huntsman International LLC of The Woodlands, Tex.

Component T1 is a propylene oxide-based ethertriamine having a first or second molecular weight of approximately 440 g/mol. Component T1 is commercially available under the trade name JEFFAMINE® T-403 from Huntsman International LLC of The Woodlands, Tex.

Component T2 is a propylene oxide-based ethertriamine having a first or second molecular weight of approximately 3,000 g/mol. Component T2 is commercially available under the trade name JEFFAMINE® T-3000 from Huntsman International LLC of The Woodlands, Tex.

Component T3 is a propylene oxide-based ethertriamine having a first or second molecular weight of approximately 5,000 g/mol. Component T3 is commercially available under the trade name JEFFAMINE® T-5000 from Huntsman International LLC of The Woodlands, Tex.

Each of the polymers of Examples 10-61 is evaluated according to the test procedures set forth below.

Equilibrium Mechanical Properties

The polymers of Examples 10-61 are evaluated on a TA Instruments Q800 Dynamic Mechanical Analyzer (DMA) equipped with a single cantilever fixture. Each sample is prepared from the respective plaque having a thickness of 3 mm by machining the plaque into strips having a length of about 25 mm and a width of 12.5 mm. Heating and cooling are controlled by a Gas Cooling Accessory (GCA) cooling system with liquid nitrogen, and the Poisson's ratio is set at a default value of 0.44. Four virgin specimens of each polymer of Examples 10-61 are evaluated to determine average values of the storage modulus (E'), loss modulus (E"), and loss angle ($\delta$) for the polymers. Each evaluation is performed in "multi-frequency, strain" mode at 1 Hz and 0.2% strain. Each specimen is equilibrated at a temperature, T, wherein $T \leq T_{trans} - 50°$ C. and $T_{trans}$ is a transformation temperature of the respective polymer. After equilibration, each specimen is held isothermally for 3 minutes at T, and heated at 2° C./min to a second temperature, $T_2$, wherein $T_2 \geq T_{trans} + 50°$ C.

Figure 2:
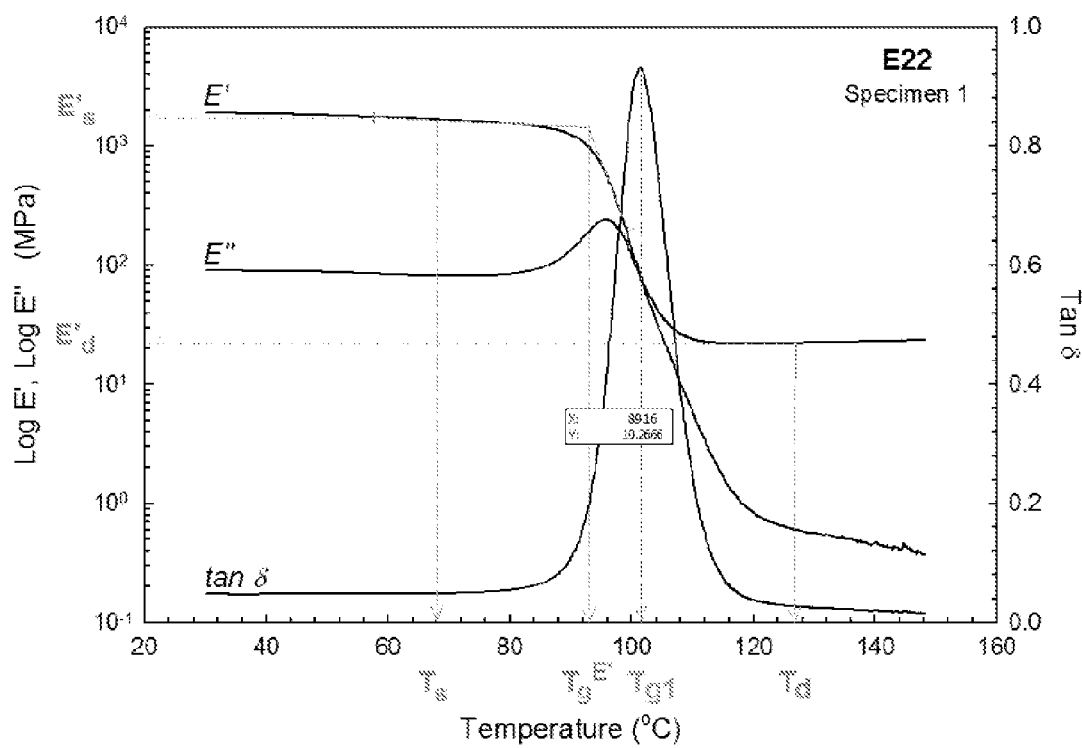
FIG. 2 is a graphical representation of a representative relationship between various equilibrium mechanical properties of the polymer of FIG. 1.

Referring to FIG. 2, the resulting data is plotted for each Example to graphically compare Log E' (MPa), Log E" (MPa), and tan $\delta$. The onset of the glass transition temperature, $T_g^{E'}$, is determined at an intersection of a first tangent and a second tangent to the storage modulus (E') curve at a transition drop, as shown in FIG. 2. The first tangent is anchored prior to the transition drop, and the second tangent is anchored at an inflection point of the transition drop, as shown in FIG. 2. The glass transition temperature, $T_g$, corresponds to an apex of the tan $\delta$ curve, and the shape memory transformation temperature, $T_{trans}$, coincides with the glass transition temperature, $T_g$. The setting temperature, $T_s$, for a shape memory effect is the temperature below the glass transition temperature, $T_g$, at which tan $\delta$ returns to a flat baseline and becomes independent of temperature. The deformation temperature, $T_d$, for the shape memory effect is the temperature above the glass transition temperature, $T_g$, at which tan $\delta$ returns to a flat baseline and becomes independent of temperature. The glassy storage modulus, $E'_s$, at the setting temperature, $T_s$, and the rubbery storage modulus, $E'_d$, at the deformation temperature, $T_d$, are also recorded.

Tensile Properties

Each of the polymers of Examples 10-61 is evaluated with an Instron 4469 apparatus equipped with an Instron 3119-009 environmental chamber, a 1 kN load cell, and manually tightened top and bottom grips having serrated grip faces (size S.25 M2, 0-250). For this evaluation, each of the polymers of Examples 10-61 is machined from the 3 mm-thick plaque to Type IV tensile bars in accordance with ASTM Standard Procedure D638. A deformation temperature, $T_d$, and an onset temperature of the glass transition, $T_g^{E'}$, are measured for each polymer according to the aforementioned explanation. The test environment is equilibrated to the deformation temperature, $T_d$, and alternatively to the onset temperature of the glass transition, $T_g^{E'}$. Each of the polymers of Examples 10-61 is placed within the top grip using aluminum foil between the polymer and the top grip to prevent specimen slippage and/or failure at the grips. Each specimen is thermally equilibrated for 5 minutes and then placed within the bottom grip using aluminum foil between the polymer and the bottom grip. Each specimen is thermally equilibrated for an additional 5 minutes. The tensile test is initiated at a crosshead speed of 5 min/min. Strain, $\delta$, is measured based on crosshead travel according to equation (1):

$$\epsilon(\%) = [(l - l_o)/1] \times 100 \quad (1)$$

wherein $l_o$ is an original length of the polymer, i.e., an initial distance between the top and bottom grips, and $(l-l_o)$ is a change in length, l, of the polymer, i.e., a displacement of the crosshead. The samples are evaluated until failure to thereby measure strain at break, $\epsilon_b$. Average values and standard errors of $\epsilon_b$ at $T_d$ and $\epsilon_b$ at $T_g^{E'}$ are calculated based on tests of 3 to 5 specimens for each sample of Examples 10-61.

Thermal Properties

Thermal properties of each of the polymers of Examples 10-61 are evaluated with a TA Instruments Q2000 differential scanning calorimeter (DSC) equipped with a refrigerated cooling system (RCS). Fifteen to 20 mg of each sample is encapsulated in separate T-Zero® aluminum pans and evaluated according to the following thermal program: 1) heat from room temperature to 150° C. at 10° C./min, 2) hold isothermally at 150° C. for 2 minutes, 3) cool to −100° C. at 10° C./min, 4) hold isothermally at 100° C. for 2 minutes, and 5) heat to 150° C. at 10° C./min. One or more (1, 2, . . . , n) glass transition temperatures, $T_{g1}$, $T_{g2}$, . . . , $T_{gn}$, is measured for each of the polymers of Examples 10-61 using the data collected during step 5) and Universal Analysis software.

Fifteen to 20 mg of each of components D1-D4, M1, M2, and T1-T3 is encapsulated in separate T-Zero® hermetic aluminum pans. Each of the components characterized by differential scanning calorimetry is liquid at room temperature. Therefore, each component is evaluated according to the following thermal program: 1) cool from room temperature to −100° C. at 10° C./min, 2) hold at −100° C. for 2 minutes, and 3) heat to 35° C. at 10° C./min. The glass transition temperature, $T_g$, is measured for each component using the data collected during step 3) using Universal Analysis software.

Phase Behavior Characterization

Each of the polymers of Examples 10-61 is cryo-fractured to provide a fractured surface. Thereafter, the fractured surface of each polymer is gold plated for further probing using one of a Hitachi S-4800 Field Emission Scanning Electron Microscope or a Zeiss NVision 40 Focused Ion Beam-Field Emission Scanning Electron Microscope at 3 kV.

Qualitative Evaluation of Shape Memory Behavior

Two rectangular 12.7 mm×38.1 mm specimens from the 3 mm-thick plaques of each of the polymers of Examples 10-61 are machined. Each rectangular specimen is then equilibrated at the respective deformation temperature, $T_d$, in a preheated oven. After equilibration, each specimen is removed from the oven and immediately manually deformed from a first rectangular shape (shown at 14 in FIG. 1) to a second "C" shape (shown at 12 in FIG. 1), and subsequently cooled to room temperature in a water bath to thereby fix the second "C" shape 12.

A first deformed specimen (the "C" shape shown at 12 in FIG. 1) of each of the polymers of Examples 10-61 is then immediately heated to the respective deformation temperature, $T_d$, in a preheated oven to thereby recover the first rectangular shape 14. A shape reversal time from the second "C" shape 12 to the first rectangular shape 14 is measured from the time of insertion into the preheated oven to the time of full shape recovery.

A second deformed specimen (the "C" shape shown at 12 in FIG. 1) of each of the polymers of Examples 10-61 is maintained at room temperature in air for 2 hours to evaluate prolonged shape fixing capability of each polymer. Subsequently, the second deformed specimen is heated to the respective deformation temperature, $T_d$, in a preheated oven to thereby recover the first rectangular shape 14. A shape reversal time from the second "C" shape 12 to the first rectangular shape 14 is measured from the time of insertion into the preheated oven to the time of full shape recovery.

The aforementioned procedure is repeated for two additional specimens of each of the polymers of Examples 10-61 using the onset temperature of the glass transition temperature, $T_g^{E'}$ as the temperature condition for the deformation. That is, the two additional rectangular 12.7 mm×38.1 mm specimens of each of the polymers of Examples 10-61 are equilibrated in a water bath heated to the onset temperature of the glass transition temperature, $T_g^{E'}$, manually deformed in situ from the first rectangular shape 14 to the second "C" shape 12, and subsequently transferred to a room temperature water bath for cooling to thereby fix the second "C" shape 12. One of the two additional specimens of each of the polymers of Examples 10-61 is reheated to $T_g^{E'}$ immediately after cooling the polymer to room temperature in the deformed "C" shape 12 to evaluate a spontaneous shape recovery ability of the polymer. Moreover, the second additional deformed specimen of each of the polymers of Examples 10-61 is kept at room temperature for 2 hours and subsequently reheated to $T_g^{E'}$ to monitor a shape recovery of the original, rectangular shape (shown at 14 in FIG. 1) and thereby evaluate a prolonged shape fixity ability and subsequent shape recovery ability of the polymer.

The results of each of the aforementioned evaluations are summarized in Tables 2 and 3, wherein the nomenclature "n.m." refers to a non-measurable quantity or relationship.

TABLE 2

Glass Transition Temperature ($T_g$), Setting Temperature ($T_s$), Deformation Temperature ($T_d$), Glass Transition Temperature at the Drop Onset of the Loss Modulus Curve ($T_g^E$), Storage Modulus at $T_s$ ($E'_s$) and $T_d$ ($E'_d$), and Elongation at Break at $T_d$ and $T_g^E$ ($\epsilon_b$ at $T_d$), ($\epsilon_b$ at $T_g^E$)

| Sample | $T_g$ (° C.) | $T_s$ (° C.) | $T_d$ (° C.) | $T_g^E$ (° C.) | $E'_s$ (MPa) | $E'_d$ (MPa) | tan δ | $\epsilon_b$ at $T_d$ (%) | $\epsilon_b$ at $T_g^E$ (%) |
|---|---|---|---|---|---|---|---|---|---|
| Ex. 10 | 97 | 67 | 127 | 87 | 2140 | 19.7 | 1.03 | 11.89 | 28.83 |
| Ex. 11 | 72 | 47 | 101 | 62 | 2157 | 14.5 | 1.17 | 14.17 | 31.69 |
| Ex. 12 | 88 | 43 | 116 | 74 | 1348 | 14.6 | 0.75 | 17.28 | n.m. |
| Ex. 20 | 102 | 71 | 129 | 93 | 1705 | 26.4 | 0.87 | 10.11 | n.m. |
| Ex. 21 | 101 | 66 | 127 | 91 | 1802 | 25.7 | 0.87 | 10.15 | 23.81 |
| Ex. 22 | 96 | 51 | 122 | 84 | 1713 | 22.6 | 0.81 | 11.89 | 38.39 |
| Ex. 30 | 81 | 52 | 114 | 70 | 2178 | 13.9 | 1.21 | 13.02 | n.m. |
| Ex. 31 | 69 | 13 | 108 | 51 | 2328 | 12.5 | 0.82 | 13.91 | 44.94 |
| Ex. 32 | 78 | 35 | 112 | 62 | 1798 | 12.2 | 0.87 | 15.51 | 49.65 |
| Ex. 40 | 83 | 56 | 116 | 72 | 2459 | 14.8 | 1.21 | 12.57 | 44.65 |
| Ex. 41 | 67 | 12 | 104 | 48 | 2248 | 11.8 | 0.78 | 13.38 | n.m. |
| Ex. 42 | 74 | 21 | 107 | 55 | 1210 | 9.7 | 0.68 | 15.88 | 60.87 |
| Ex. 50 | 98 | 62 | 126 | 85 | 1294 | 14.9 | 0.75 | 19.60 | 34.74 |

TABLE 2-continued

Glass Transition Temperature ($T_g$), Setting Temperature ($T_s$), Deformation Temperature ($T_d$), Glass Transition Temperature at the Drop Onset of the Loss Modulus Curve ($T_g^E$), Storage Modulus at $T_s$ ($E'_s$) and $T_d$ ($E'_d$), and Elongation at Break at $T_d$ and $T_g^E$ ($\epsilon_b$ at $T_d$), ($\epsilon_b$ at $T_g^E$)

| Sample | $T_g$ (°C.) | $T_s$ (°C.) | $T_d$ (°C.) | $T_g^E$ (°C.) | $E'_s$ (MPa) | $E'_d$ (MPa) | tan δ | $\epsilon_b$ at $T_d$ (%) | $\epsilon_b$ at $T_g^E$ (%) |
|---|---|---|---|---|---|---|---|---|---|
| Ex. 51 | 63 | −6 | 105 | 40 | 2172 | 14.5 | 0.59 | 9.63 | 47.56 |
| Ex. 60 | 99 | 67 | 127 | 87 | 1636 | 22.7 | 0.80 | 12.58 | 32.91 |
| Ex. 61 | 91 | 48 | 123 | 78 | 2159 | 25.5 | 0.77 | 8.60 | 25.74 |

TABLE 3

Ratio of Ethylene Oxide to Propylene Oxide (EO:PO), Transition Temperature ($T_{trans}$), Elongation at Break ($\epsilon_b$), and Shape-Memory Effect at $T_{trans}$ or $T_g^E$

| Sample | EO/PO (mol:mol) | $T_{trans}$ (°C.) | $\epsilon_b$ at $T_d$ (%) | $\epsilon_b$ at $T_g^E$ (%) | Shape-Memory at $T_{trans}$? | Shape-Memory at $T_g^E$? |
|---|---|---|---|---|---|---|
| Ex. 10 | 0 | 97 | 11.89 | 28.83 | Yes | Yes |
| Ex. 11 | 0 | 72 | 14.17 | 31.69 | Yes | Yes |
| Ex. 12 | 0 | 88 | 17.28 | n.d. | Yes | Yes |
| Ex. 20 | 0 | 102 | 10.11 | n.d. | Yes | Yes |
| Ex. 21 | 0 | 101 | 10.15 | 23.81 | Yes | Yes |
| Ex. 22 | 0 | 96 | 11.89 | 38.39 | Yes | Yes |
| Ex. 30 | 0 | 81 | 13.02 | n.d. | Yes | Yes |
| Ex. 31 | 0 | 69 | 13.91 | 44.94 | Yes | Yes |
| Ex. 32 | 0 | 78 | 15.51 | 49.65 | Yes | Yes |
| Ex. 40 | 0 | 83 | 12.57 | 44.65 | Yes | Yes |
| Ex. 41 | 0 | 67 | 13.38 | n.d. | Yes | Yes |
| Ex. 42 | 0 | 74 | 15.88 | 60.87 | Yes | Yes |
| Ex. 50 | 0.21 | 98 | 19.60 | 34.74 | Yes | Yes |
| Ex. 51 | 3.13 | 63 | 9.63 | 47.56 | Yes | Yes |
| Ex. 60 | 0.21 | 99 | 12.58 | 32.91 | Yes | Yes |
| Ex. 61 | 3.13 | 91 | 8.60 | 25.74 | Yes | Yes |

Storage Modulus

As shown in Table 2, each of the samples from Examples 10-61 exhibits an elevated glass storage modulus, $E'_s$, of from about 1.2 GPa to about 2.5 GPa. Similarly, each of the polymers of Examples 10-61 exhibits an elevated rubbery storage modulus, $E'_d$, of from about 9.7 MPa to about 26.4 MPa. Therefore, the polymers including the reaction product of the epoxy resin, the first crosslinking agent, and the second crosslinking agent are characteristic of high-strength polymers with elevated glass storage moduli, E', in both a glassy and rubbery state, especially when compared to glass storage moduli, E', of other thermoplastic and thermosetting polymers (not shown) in either of the respective glassy and rubbery states.

Varying Second Molecular Weight of the Second Crosslinking Agent

Referring now to Table 3, the polymer of Example 12 has a higher $\epsilon_b$ at $T_d$ than either of the polymers of Examples 10 and 11. The second crosslinking agent of the polymer of Example 12, component D4, also has a higher second molecular weight than either of the second crosslinking agents of Examples 10 and 11, components D2 and D3, respectively. Similarly, the polymer of Example 22 has a higher $\epsilon_b$ at $T_d$ than either of the polymers of Examples 20 and 21. The second crosslinking agent of the polymer of Example 22, component D4, also has a higher second molecular weight than either of the second crosslinking agents of Examples 20 and 21, components D2 and D3, respectively. Likewise, the polymer of Example 32 has a higher $\epsilon_b$ at $T_d$ than either of the polymers of Examples 30 and 31, and the polymer of Example 42 has a higher $\epsilon_b$ at $T_d$ than either of the polymers of Examples 40 and 41. The second crosslinking agent of the polymer of Example 32, component T3, also has a higher second molecular weight than either of the second crosslinking agents of Examples 30 and 31, components T1 and T2, respectively. Similarly, the second crosslinking agents of the polymer of Example 42, component T3, also has a higher second molecular weight than either of the second crosslinking agents of Examples 40 and 41, components T1 and T2, respectively.

Further, in addition to the polymers exhibiting a high $\epsilon_b$ at $T_d$, the $T_{trans}$ of the polymers of Examples 12, 22, 32, and 42 also remains higher than 70° C. Without intending to be limited by theory, the excellent $T_{trans}$ may correspond to the first glass transition temperature, $T_{g1}$, of the first, epoxy-rich phase. Therefore, the polymers of Examples 12, 22, 32, and 42, which include a second crosslinking agent having comparatively higher molecular weight than the second crosslinking agents of the other polymers in the respective series, exhibit both enhanced deformability and a high transformation temperature, $T_{trans}$, as compared to the polymers of Examples 11, 21, 31, and 41. Therefore, as the second molecular weight of the second crosslinking agent increases for each of the polymers of Examples 10-42, the $\epsilon_b$ at $T_d$ of the polymer increases. That is, the second molecular weight of at least ten times greater than the first molecular weight of the first crosslinking agent may contribute to phase separation within the polymer.

Varying Ratio of Ethylene Oxide to Propylene Oxide

Moreover, as shown in Table 3, the polymers of Examples 50 and 60 have a higher $\epsilon_b$ at $T_d$ than either of the polymers of Examples 51 and 61. However, as shown in Table 1, the polymers of Examples 50, 51, 60, and 61 each include a second crosslinking agent having the same molecular weight, i.e., approximately 2,000 g/mol. Referring again to Table 3, the ratio of ethylene oxide to propylene oxide in the second crosslinking agent for the polymers of Examples 50 and 60 (0.21) is less than the ratio of ethylene oxide to propylene oxide for the second crosslinking agent of the polymers of Examples 51 and 61 (3.13).

Therefore, for polymers including second crosslinking agents having similar molecular weights, as the ratio of ethylene oxide to propylene oxide of the second crosslinking agent decreases for each of the polymers of Examples 50-61, the $\epsilon_b$ at $T_d$ of the polymer increases. Stated differently, as the ethylene oxide content of the second crosslinking agent of the polymers of Examples 50-61 increases, the $\epsilon_b$ at $T_d$ of the polymer also increases. Without intending to be limited by theory, the ratio of ethylene oxide to propylene oxide of the second crosslinking agent of less than or equal to about 1:1 may contribute to phase separation in the polymers of Examples 50 and 60. That is, decreasing the ratio of ethylene oxide to propylene oxide may promote formation of the first, epoxy-rich phase and the second, polyether-rich phase, wherein the first phase is immiscible within the second phase.

These results may be attributable to a comparatively lower compatibility between ethylene oxide segments and the epoxy resin (component ER) of the polymers as compared to the compatibility of propylene oxide segments and the epoxy resin.

Further, the $T_{trans}$ of the polymers of Examples 50 and 60 also remains higher than 95° C. Without intending to be limited by theory, the excellent $T_{trans}$ may correspond to the first glass transition temperature, $T_{g1}$, of the first, epoxy-rich phase. Therefore, the polymers of Examples 50 and 60, which include a second crosslinking agent having a ratio of ethylene oxide to propylene oxide of less than 1:1, exhibit both enhanced deformability and a high transformation temperature, $T_{trans}$, as compared to the polymers of Examples 51 and 61.

As such, phase separation within the polymers of Examples 12, 22, 32, 42, 50 and 60 may be induced by increasing the molecular weight of the second crosslinking agent of the polymers (Examples 12, 22, 32, and 42) and/or by decreasing a ratio of ethylene oxide to propylene oxide of the second crosslinking agent of the polymers (Examples 50 and 60). Further, a combination of both increasing the length of the second crosslinking agent relative to the first crosslinking agent, and varying a ratio of ethylene oxide to propylene oxide with respect to the epoxy resin may promote formation of the first, epoxy-rich phase and the second, polyether-rich phase. The resulting biphasic polymers exhibit excellent deformability, as measured by $\epsilon_b$ at $T_d$, while simultaneously maintaining high transformation temperatures, $T_{trans}$. The biphasic polymers, provided by the combination of increased length of the second crosslinking agent and a select ratio of ethylene oxide to propylene oxide with respect to the epoxy resin, may be toughened as compared to the monophasic polymers. The toughening of the biphasic polymers may contribute to the increased deformability and simultaneous high transformation temperature, $T_{trans}$, of the biphasic polymers as compared to the monophasic polymers.

Figure 3A:
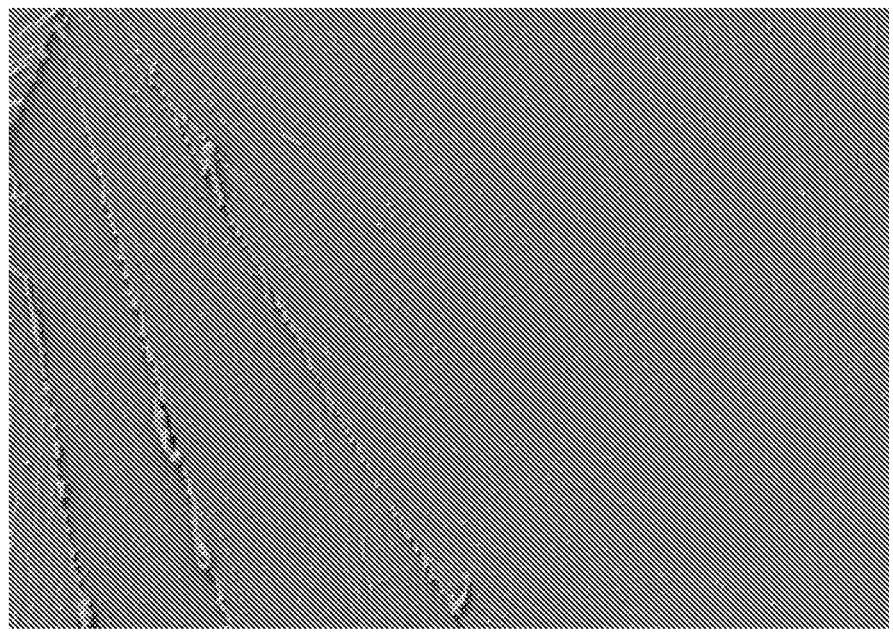
FIG. 3A is a scanning electron micrograph of a monophasic polymer including a second crosslinking agent having a molecular weight of approximately 2,000 g/mol and a ratio of ethylene oxide to propylene oxide of greater than 1:1.
Figure 3B:
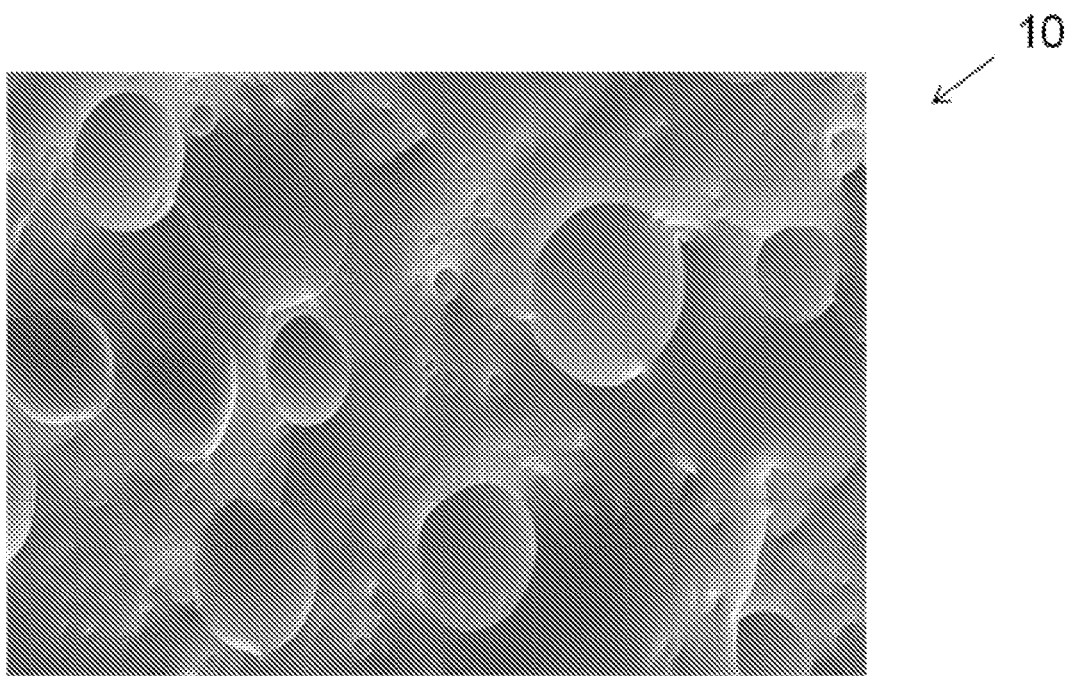
FIG. 3B is a scanning electron micrograph of the polymer of FIG. 1, wherein the polymer is biphasic and includes a second crosslinking agent having a molecular weight of approximately 2,000 g/mol and a ratio of ethylene oxide to propylene oxide of less than 1:1.

Referring now to FIGS. 3A and 3B, a scanning electron micrograph of the polymer of Example 51 (FIG. 3A) after cryo-fracture, as described above, is compared to a scanning electron micrograph of the polymer of Example 50 (FIG. 3B) after cryo-fracture. The scanning electron micrograph of FIG. 3A indicates that the polymer of Example 51 is monophasic, i.e., the polymer of Example 51 exists only as a single, continuous phase. In contrast, the scanning electron micrograph of FIG. 3B indicates that the polymer of Example 50 is biphasic, i.e., the polymer of Example 50 exists as a continuous phase and a globular, dispersed phase. The continuous phase may correspond to the first, epoxy-rich phase set forth above, and the globular, dispersed phase may correspond to the second, polyether-rich phase set forth above.

Figure 4:
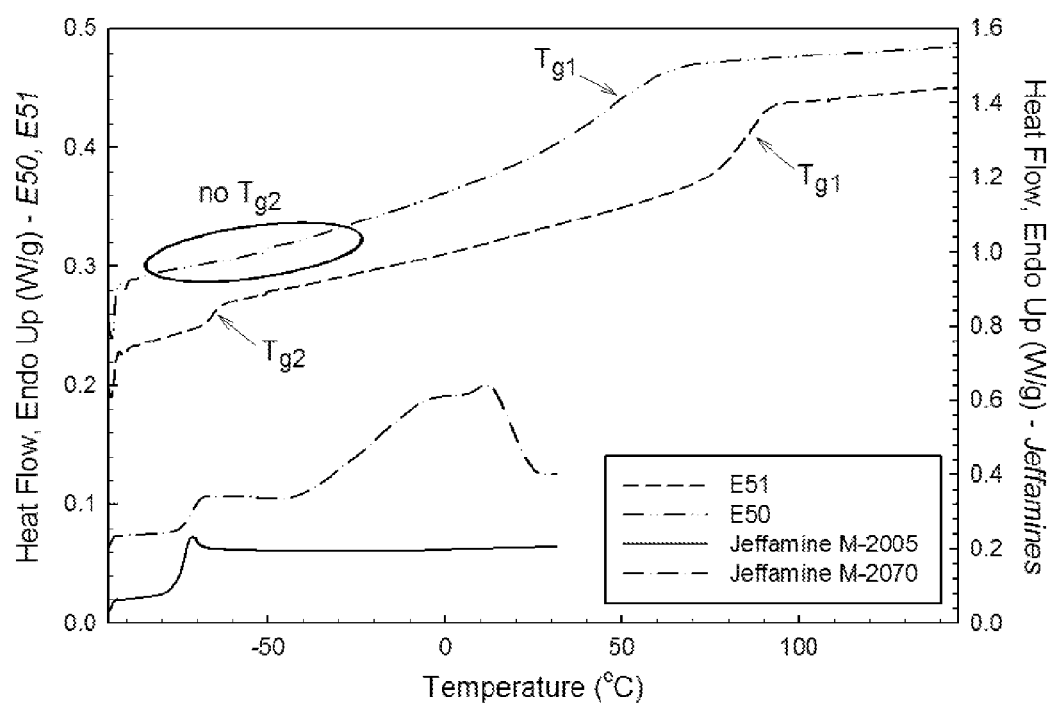
FIG. 4 is a graphical representation of differential scanning calorimetry data of the polymers of Examples 50 and 51.

Referring now to FIG. 4, a graphical representation of differential scanning calorimetry data of the polymer of Example 51 is compared to differential scanning calorimetry data of the polymer of Example 50. The data of Example 50 includes a first and second glass transition temperature, $T_{g1}$ and $T_{g2}$. In contrast, the data of Example 51 includes only a single glass transition temperature. The second glass transition temperature, $T_{g2}$, of the polymer of Example 50 is sub-zero and corresponds to the glass transition temperature of the second crosslinking agent, component M1. Further, the second glass transition temperature, $T_{g2}$, of the polymer of Example 50 is greater than 0° C. and corresponds to the glass transition temperature of the epoxy resin, component ER. In contrast, the glass transition temperature of Example 51 only corresponds to a value between the respective glass transition temperatures of each of the constituents of the polymer of Example 51, i.e., component ER and component M2. Therefore, the differential scanning calorimetry data of FIG. 4 confirms that the polymer of Example 50 is biphasic, whereas the polymer of Example 51 is monophasic.

Without intending to be limited by theory, the relatively lower ratio of ethylene oxide to propylene oxide of the second crosslinking agent of Example 50 as compared to the polymer of Example 51 may contribute to the presence and immiscibility of the first phase and the second phase of the polymer of Example 50.

Shape-Memory Behavior

Notwithstanding the above results, each of the polymers of Examples 10-61 is evaluated for shape-memory properties. That is, each of the polymers is evaluated to determine whether the polymer is transformable between the first shape 14 (FIG. 1) and the second shape 12 (FIG. 1) at the transition temperature, $T_{trans}$. As summarized in Table 3, each of the polymers of Examples 10-61 exhibits excellent shape-memory behavior and is transformable between the first shape 14 and the second shape 12 at the transition temperature, $T_{trans}$. However, it is noted that the polymers of Examples 12, 22, 32, 42, 50, and 60 each have a transition temperature, $T_{trans}$, corresponding to the first glass transition temperature, $T_{g1}$.

Referring again to Table 2, the temperature at which the deformation of the polymers of Examples 10-61 is performed affects the elongation at break, $\epsilon_b$, of the polymers. In particular, as the temperature during deformation is decreased from $T_d$ (wherein $T_d > T_g$) to $T_g^{E'}$ (the onset of the glass transition), the elongation at break, $\epsilon_b$, increases. Therefore, excellent shape-memory behavior and, concurrently, elevated elongations at break, $\epsilon_b$, may be obtained by deforming the polymers of Examples 10-61 at the onset of the glass transition temperature, $T_g^{E'}$.

While the best modes for carrying out the disclosure have been described in detail, those familiar with the art to which this disclosure relates will recognize various alternative designs and embodiments for practicing the disclosure within the scope of the appended claims.

The invention claimed is:

1. A polymer comprising a reaction product of:
    an epoxy resin;
    a first crosslinking agent reactive with said epoxy resin and having a first molecular weight; and
    a second crosslinking agent reactive with said epoxy resin and having a second molecular weight of at least ten times greater than said first molecular weight;
    wherein said second crosslinking agent is an ether-monoamine having a polyether backbone and a second molecular weight of approximately 2,000 g/mol;
    wherein the polymer has a first phase having a first glass transition temperature and a second phase having a second glass transition temperature that is lower than said first glass transition temperature;
    wherein the polymer is transformable between a first shape and a second shape at said first glass transition temperature.

2. The polymer of claim 1, wherein said first molecular weight is less than or equal to approximately 500 g/mol.

3. The polymer of claim 1, wherein said epoxy resin is present in said first phase in an amount of greater than 50 parts by weight based on 100 parts by weight of said first phase.

4. The polymer of claim 1, wherein said polyether backbone includes propylene oxide.

5. The polymer of claim 4, wherein said polyether backbone further includes ethylene oxide.

6. The polymer of claim 5, wherein a ratio of ethylene oxide to propylene oxide in said second crosslinking agent is less than about 1:1.

7. The polymer of claim 1, wherein said first crosslinking agent is an etherdiamine having a first molecular weight of less than or equal to approximately 150 g/mol.

8. The polymer of claim 1, wherein said epoxy resin is a diglycidyl ether of bisphenol-A-based epoxy resin.

9. The polymer of claim 1, wherein said first glass transition temperature is greater than or equal to about 70° C.

10. The polymer of claim 9, wherein the polymer has an elongation at break of greater than about 11% at a temperature greater than said first glass transition temperature.

11. The polymer of claim 1, wherein the polymer is a thermoset polymer.

12. A polymer comprising a reaction product of:
   an epoxy resin;
   a first amine reactive with said epoxy resin and having a first molecular weight of less than approximately 500 g/mol; and
   a second amine reactive with said epoxy resin and having a second molecular weight of greater than approximately 2,000 g/mol;
   wherein said second amine has a polyether backbone including ethylene oxide and propylene oxide in a ratio of ethylene oxide to propylene oxide of from about 0.1:1 to about 0.5:1;
   wherein the polymer has a first phase having a first glass transition temperature and a second phase having a second glass transition temperature that is lower than said first glass transition temperature;
   wherein said epoxy resin is present in said first phase in an amount of greater than 50 parts by weight based on 100 parts by weight of said first phase;
   wherein the polymer is transformable between a first shape and a second shape at said first glass transformation temperature.

13. The polymer of claim 12, wherein said first glass transition temperature is greater than or equal to about 95° C.

14. A polymer comprising a reaction product of:
   a diglycidyl ether of bisphenol-A-based epoxy resin;
   a first etheramine reactive with said diglycidyl ether of bisphenol-A-based epoxy resin and having a first molecular weight of less than approximately 500 g/mol; and
   a second oligomeric etheramine reactive with said diglycidyl ether of bisphenol-A-based epoxy resin and having a second molecular weight of greater than approximately 2,000 g/mol;
   wherein said second oligomeric etheramine has a polyether backbone including ethylene oxide and propylene oxide in a ratio of ethylene oxide to propylene oxide of from about 0.1:1 to about 0.5:1;
   wherein the polymer has a first phase having a first glass transition temperature and a second phase having a second glass transition temperature that is lower than said first glass transition temperature;
   wherein said diglycidyl ether of bisphenol-A-based epoxy resin is present in said first phase in an amount of greater than 50 parts by weight based on 100 parts by weight of said first phase;
   wherein the polymer is transformable between a first shape and a second shape at said first glass transformation temperature.

\* \* \* \* \*